(12) United States Patent
Chen (10) Patent No.: US 8,406,198 B2
(45) Date of Patent: *Mar. 26, 2013

(54) DISTRIBUTED MOBILE AGENT

(75) Inventor: Xiaobao Chen, Bath (GB)

(73) Assignee: Orange SA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,380

(22) Filed: Mar. 5, 2012

(65) Prior Publication Data

US 2012/0163329 A1 Jun. 28, 2012

Related U.S. Application Data (63) Continuation of application No. 12/950,910, filed on Nov. 19, 2010, now Pat. No. 8,130,725, which is a continuation of application No. 10/549,033, filed as application No. PCT/GB2004/001657 on Apr. 16, 2004, now Pat. No. 7,839,825.

(30) Foreign Application Priority Data

Apr. 17, 2003 (GB) .................................. 0308980.2

(51) Int. Cl.
*H04W 4/00* (2009.01)
(52) U.S. Cl. ........ 370/331; 455/445; 370/329; 370/351; 370/392
(58) Field of Classification Search ....... 455/432.1–445, 455/452.2; 370/329–331, 351, 392
See application file for complete search history.

(56) References Cited

U.S. PATENT DOCUMENTS

| | | | |
|---|---|---|---|
| 6,799,044 B1 | 9/2004 | Wesby et al. | |
| 2003/0202480 A1* | 10/2003 | Swami | 370/252 |
| 2004/0090941 A1* | 5/2004 | Faccin et al. | 370/338 |
| 2004/0098490 A1* | 5/2004 | Dinker et al. | 709/229 |
| 2006/0010243 A1* | 1/2006 | DuRee | 709/230 |

FOREIGN PATENT DOCUMENTS

| | | | |
|---|---|---|---|
| EP | 1134991 | * | 9/2001 |
| WO | WO 01/06734 | * | 1/2001 |

OTHER PUBLICATIONS

C. Perkins, IP Mobility Support for IPv4, IETF Request for Comment (RFC) 3344, http://www.ietf.org/rfc/rfc3344.txt?number=3344, Aug. 2002, 93 pages.
Johnson, et al., Mobility Support in IPv6 draft-ietf-mobileip-ipv6-20.txt, IETF Mobile IP Working Group, http://tools.ietf.org/wg/mip6/draft-ietf-mobileip-ipv6/draft-ietf-mobileip-ipv6-20.txt, Jun. 20, 2003, 157 pages.
Farinacci, et al., Generic Routing Encapsulation (GRE), Request for Comments 2784, Mar. 2000, 9 pages.
C. Perkins, IP Encapsulation within IP, Request for Comment 2003, http://www.ietf.org/rfc/rfc2003/txt, Oct. 1996, 14 pages.
C. Perkins, Minimal Encapsulation within IP, Request for Comment 2004, http://ietf.nri.reston.va.us/rfc/rfc2004.txt, Oct. 1996, 6 pages.
A. Conta, Generic Packet Tunneling in IPv6, Request for Comment 2473, http://www.ietf.org/rfc/rfc2473.txt?number=2473, Dec. 1998, 34 pages.

* cited by examiner

*Primary Examiner* — Lester Kincaid
*Assistant Examiner* — Mehmood B Khan
(74) *Attorney, Agent, or Firm* — Knobbe Martens Olson & Bear LLP (57) ABSTRACT

Systems, apparatus, and methods for forwarding data packets towards a mobile node roaming in a foreign packet-switched data network are disclosed. The data packets having been addressed to a home address of the mobile node, the mobile node being provided with a care of address for use in the foreign network, the systems, apparatus, and methods comprise various features.

13 Claims, 9 Drawing Sheets

DISTRIBUTED MOBILE AGENT

CROSS-REFERENCE TO RELATED APPLICATIONS

This application claims the benefit and priority to and is a continuation of U.S. patent application Ser. No. 12/950,910, entitled "DISTRIBUTED MOBILE AGENT," to Xiaobao Chen, filed Nov. 19, 2010, issued on Mar. 6, 2012 as U.S. Pat. No. 8,130,725, which is a continuation of and claims the benefit of priority to U.S. patent application Ser. No. 10/549,033, entitled "DISTRIBUTED MOBILE AGENT," to Xiaobao Chen, filed Mar. 20, 2006, issued on Nov. 23, 2010 as U.S. Pat. No. 7,839,825, which is a U.S. National Phase application of and claims the benefit of priority to PCT International Application No. PCT/GB2004/001657, filed Apr. 16, 2004 designating the United States of America and published in the English language which claims the benefit of priority to G.B. Patent Application No. 0308980.2 filed Apr. 17, 2003. The disclosures of the above-referenced applications are hereby expressly incorporated by reference in their entireties.

BACKGROUND OF THE INVENTION

1. Field of the Invention

The present invention relates to forwarding data packets towards a mobile node roaming in a foreign packet-switched data network, the data packets having been addressed to a home address of the mobile node, the mobile node being provided with a care of address for use in the foreign packet-switched data network. In particular, but not exclusively, the present invention relates to Mobile IP.

2. Description of the Related Art

Whereas conventional 2 G mobile networks, such as those conforming to the Global System for Mobile Communications (GSM) standards, have provided circuit-switched voice and data services to user's mobile stations (MSs), there is great momentum in the mobile telecommunications industry to deploy packet-switched mobile networks. Packet-switched mobile networks have significant advantages in terms of network and radio resource efficiency and also enable the provision of more advanced user services. With the convergence of fixed and mobile telecommunications, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognized benefits over IPv4, notably in terms of greatly increased address space, more efficient routing, greater scalability, improved security, Quality of Service (QoS) integration, support for multicasting and other features.

A particular example of a mobile packet-switched service currently being deployed is the General Packet Radio Service (GPRS) as implemented in both 2 G GSM networks and in 3 G Universal Mobile Telecommunications System (UMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centers, airports, exhibition centers, etc). wLAN subnetworks may be implemented within the same administrative network domain as GPRS subnetworks, and mobile network operators will want to support mobility of mobile stations between those subnetworks. Furthermore, mobile network operators will want to support roaming of mobile stations between different administrative network domains, which may or may not implement different access technologies.

While GPRS networks, having been designed from the start as mobile networks, have built-in mobility management (for MS s within the GPRS network) and roaming functionality (for MSs roaming between GPRS networks), work has also taken place in the Internet Engineering Task Force (IETF) to support mobility of IP user terminals in general. To this end, the IETF have developed the Mobile IP (M P) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network as well as mobility between two different GPRS networks or subnetworks. Mobile IP is not expected to be used for mobility management within a network or sub-network (micro-mobility) which is typically managed by access technology specific layer 2 mechanisms such as WCDMA softer/soft handover.

There are two versions of MIP to correspond to the two versions of IP. MIP version 4 (MIPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 3344 available at the IETF website. Internet draft MIPv6 is described in the IETF Internet draft "Mobility Support in IPv6" available at the IETF website.

Figure 1:
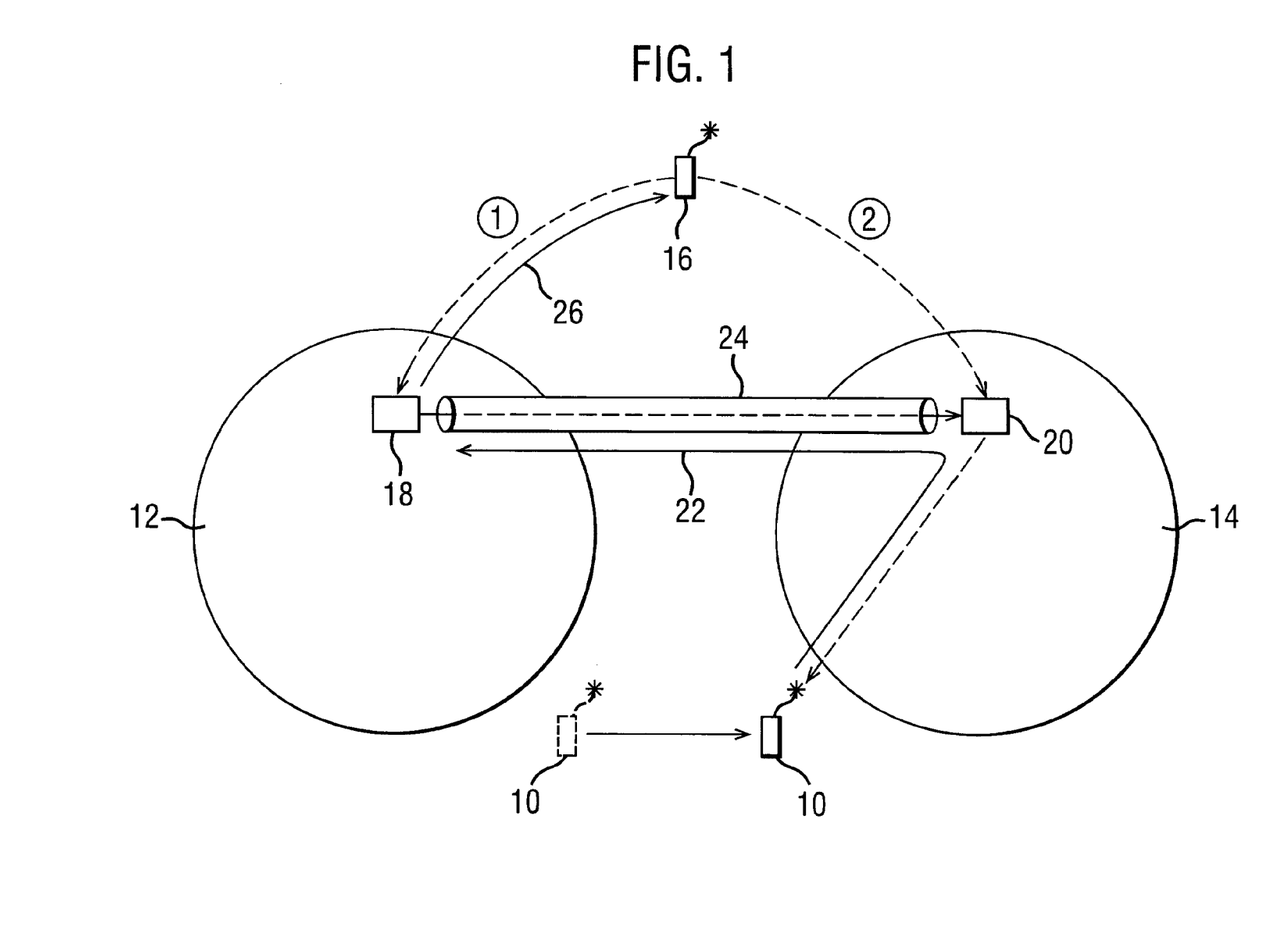
FIG. 1 is a block diagram showing conventional mobility management as provided in MIPv4.

Mobility management as defined in MIPv4 is illustrated in FIG. 1. A MN 10 is allocated a home IP address (HAddr) in its Home Network (HN) 12. Routing procedures in the HN ensure that wherever the MN is within the HN, an IP packet sent from a Correspondent Node (CN) 16 will reach the MN. However, when the MN roams to a foreign network (FN) 14, IP packets addressed to its HAddr will need to be routed to its new location in the FN. In MIPv4, a router 18 in the HN known as the Home Agent (HA) is used to act as a packet forwarding service on behalf of the MN when it is away from home. In a first working mode of MIPv4 (known as FA-CoA mode), when arriving in the FN, the MN is allocated a Care of Address (CoA) by a router 20 in the FN known as the Foreign Agent (FA). Due to perceived limitations of IPv4 address space, it is envisaged that more than one MN may share the same CoA. After allocation of the CoA, MN 10 sends a binding update message 22 to the HA via the FA to register the CoA. More specifically, the binding update message 22 informs the HA of the association (or binding) between the HAddr and CoA of the MN. Thereafter, when the CN sends a packet to the HAddr of the MN in its HN (case 1), the packet is intercepted by the HA and tunnelled to the FA in the FN via tunnel 24 on the basis of the CoA.

Tunnelling involves encapsulating a first data packet (with a header and a payload) as the payload of a second data packet having a new header indicating, as its source and destination addresses, the start and end points of the tunnel, and transferring the second data packet as normal to the tunnel endpoint where it is decapsulated to obtain the first packet. After decapsulation, the tunnel end point, the FA, routes the original packet to the MN using routing procedures in the FN. In MIP, tunnelling involves IP in IP encapsulation using the IETF Request For Comment (RFC) 2003. Thus in MIPv4, an IPv4 packet is tunnelled by encapsulating it within another IPv4 packet.

As an optional procedure in MIPv4, the HA may send a binding update message 26 to the CN to register the CoA of the MN. More specifically, the binding update message 26 informs the CN of the association (or binding) between the HAddr and CoA of the MN. Thereafter, the CN may address packets directly to the MN at its current CoA, rather than indirectly via its HAddr (case 2), and these packets are received by the FA in the FN and routed to the MN using routing procedures in the FN. This is known as route optimization since it avoids potentially inefficient triangular routing via the HA which in general will not be on an efficient routing path between the CN and the FA.

In a second optional working mode of MIPv4 (known as CoCoA mode) there is no sharing of CoAs by MNs away from their home network and no FA is used. The MN is allocated a unique CoA, known as a co-located CoA (Co-CoA). In this working mode, the MN sends a binding update message directly to its HA to register its newly allocated CoCoA. Thereafter, packets sent by a CN and addressed to the MN at its HAddr are tunnelled from the HA directly to the MN. As with FA-CoA mode, as an optional procedure in CoCoA mode, the MN may also send a binding update to a CN to register its CoCoA. Thereafter, packets may be sent by the CN directly to the MN at its CoCoA.

Figure 2:
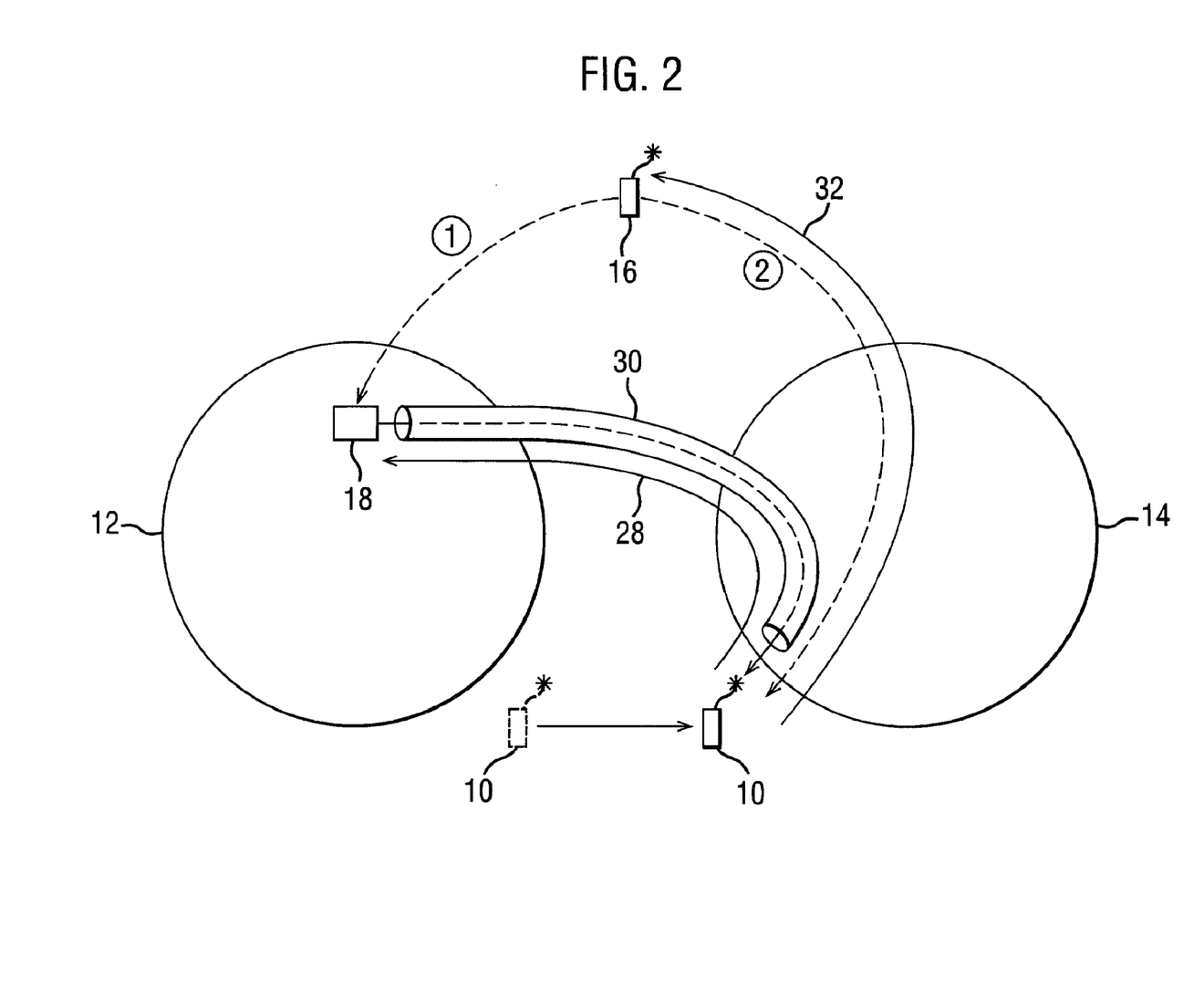
FIG. 2 is a bock diagram showing conventional mobility management as provided in MIPv6.

Mobility management as defined in MIPv6 is illustrated in FIG. 2. Two notable differences of MIPv6 over MIPv4 are as follows. Firstly, due to the greatly increased address space in IPv6, CoAs allocated to a MN in a FN are never shared (i.e., they correspond to the optional CoCoA in MIPv4). Secondly, as a result, there is no need to deploy a FA in the FN. Referring to FIG. 2, with MIPv6, when a MN 10 moves from its HN 12 to a FN 14, it is allocated a unique CoA and sends a binding update message 28 directly to its HA 18 in its HN to register the CoA. Packets from a CN 16 addressed to the HAddr are intercepted by the HA 18 (case 1) and tunnelled to the CoA via tunnel 30. This tunnelling may be achieved using IPv6 Generic Packet Tunnelling Mechanism described in IETF RFC 2473. However, in MIPv6, route optimization is not an option but a fundamental part of the protocol and, in general, the MN (not the HA as in MIPv4) should send a binding update message 32 to the CN so that it may address packets directly to the MN at its CoA (case 2). When an MN receives a packet tunnelled from a CN via the MN's HA, it may take this as an indication that the CN has no binding for the MN and initiate a CN binding update.

Both MIPv4 and MIPv6 allow more than one router in each network or subnetwork to act as a mobile agents (i.e., a HAs or FAs) serving the population of MNs. In other words, MIPv4 and MIPv6 allow for redundancy of mobile agents. Mobile agent (MA) discovery mechanisms are provided so that individual MNs may identify an appropriate router to act as their HA or FA for a period of time. Thus, MIPv4 and MIPv6 allow for load balancing and provide a degree of reliability by protecting against the vulnerability of having a single router acting as a MA and thereby being a central point of failure.

However, reliability is still expected to be a problem due to the nature of the functions performed by MAs in both MIPv4 and MIPv6. Also, scalability and network efficiency are expected to be problematic. The problems are expected to be most acute with MNs potentially widely distributed over various networks or subnetworks covering large geographical areas.

SUMMARY OF THE INVENTION

In one aspect, a system for forwarding data packets towards a mobile node roaming in a foreign packet-switched data network is provided. The data packets are addressed to a home address of the mobile node and the mobile node is provided with a care of address for use in the foreign network. The system includes a packet-switched network. The packet-switched network includes a plurality of mobile agent traffic bearer entities and a mobile agent control entity. Of the traffic bearer entities and the control entity, only the traffic bearer entities are configured to perform tunneling of data packets to the mobile node roaming in the foreign network. The control entity is configured to control tunneling management of the plurality of traffic bearer entities. The control entity is further configured to receive a plurality of binding messages, each binding message indicating a binding between the home address and the care of address of the mobile node. The control entity is also configured to select one or more traffic bearer entities from the plurality of traffic bearer entities. The control entity is further configured to, in response to the received binding message, send a first control message to control the operation of at least one of the one or more selected mobile agent traffic bearer entities.

The at least one selected mobile agent traffic bearer entity included in the system is further configured to receive the first control message from the mobile agent control entity. The at least one selected mobile agent traffic bearer entity is also configured to, in response to the first control message, provide a resource for forwarding the data packets towards the mobile node at the care of address. All resources in the system for forwarding the data packets towards the mobile node at the care of address are provided by the mobile agent traffic bearer entities. Furthermore, the mobile agent control entity is configured to select the mobile agent traffic bearer entity based on one or more parameters such as the geographical and/or topological proximity of the mobile node to the plurality of mobile agent traffic bearer entities, the quality of service capable of being provided by the plurality of mobile agent traffic bearer entities, and the security functions capable of being provided by the plurality of mobile agent traffic bearer entities.

The mobile agent control entity is further configured to send a second control message to the at least one of the one or more selected mobile agent traffic bearer entities. The at least one selected mobile agent traffic bearer entity is further configured to, in response to the second control message, release the resource for forwarding the data packets towards the mobile node at the care of address.

In some implementations, the mobile agent control entity may be a home agent control entity and the mobile agent traffic bearer entity may be a home agent traffic bearer entity. It may be desirable to include the tunnel provided by the home agent traffic bearer entity from the home agent traffic bearer entity to the care of address of the mobile node.

In some implementations, the mobile agent control entity may be a foreign agent control entity and the mobile agent traffic bearer entity may be a foreign agent traffic bearer entity. In such implementations, the tunnel provided by the foreign agent traffic bearer entity may be from the foreign agent traffic bearer entity to a home agent of the mobile node.

According to another aspect of the present invention, a mobile agent control entity in a packet-switched network which includes a plurality of mobile agent traffic bearer entities and a mobile agent control entity is provided. Of the traffic bearer entities and the control entity, only the traffic bearer entities are configured to perform tunneling of data packets to a mobile node roaming in a foreign network. The control entity is configured to control tunneling management of the plurality of traffic bearer entities and to control the forwarding data packets towards a mobile node roaming in a foreign packet-switched data network. The data packets are addressed to a home address of the mobile node. The mobile node is provided with a care of address for use in the foreign network.

The mobile agent control entity is further configured to receive a message indicating a binding between the home address and the care of address of the mobile node. The mobile agent control entity is also configured to select the mobile agent traffic bearer entity from the plurality of traffic bearer entities. The mobile agent control entity is additionally configured to, in response to the binding message, control the operation of the selected mobile agent traffic bearer entity to provide a tunnel for forwarding the data packets towards the mobile node at the care of address.

The mobile agent control entity is configured to select the mobile agent traffic bearer entity based on one or more parameters such as the geographical and/or topological proximity of the mobile node to the plurality of mobile agent traffic bearer entities, the quality of service capable of being provided by the plurality of mobile agent traffic bearer entities, and the security functions capable of being provided by the plurality of mobile agent traffic bearer entities. The mobile agent control entity is further configured to instruct the selected mobile agent traffic bearer entity to delete the tunnel for forwarding the data packets towards the mobile node at the care of address.

In yet another aspect of the present invention, a mobile agent control entity in a packet-switched network which includes a plurality of mobile agent traffic bearer entities and a mobile agent control entity is provided. Of the traffic bearer entities and the control entity, only the traffic bearer entities are configured to perform tunneling of data packets to a mobile node roaming in a foreign network. The control entity is configured to control tunneling management of the plurality of traffic bearer entities and to control the forwarding data packets towards a mobile node roaming in a foreign packet-switched data network. The data packets are addressed to a home address of the mobile node. The mobile node is provided with a care of address for use in the foreign network.

The mobile agent control entity is further configured to receive a message indicating a binding between the home address and the care of address of the mobile node. The mobile agent control entity is also configured to select the mobile agent traffic bearer entity from the plurality of traffic bearer entities. The mobile agent control entity is additionally configured to, in response to the binding message, control the operation of the selected mobile agent traffic bearer entity to provide a tunnel for forwarding the data packets towards the mobile node at the care of address.

The mobile agent control entity is configured to select the mobile agent traffic bearer entity based on one or more parameters such as the geographical and/or topological proximity of the mobile node to the plurality of mobile agent traffic bearer entities, the quality of service capable of being provided by the plurality of mobile agent traffic bearer entities, and the security functions capable of being provided by the plurality of mobile agent traffic bearer entities. In this aspect, the mobile agent traffic bearer entity is further controllable by the mobile agent control entity to, in response to a tunnel deletion control message transmitted by the mobile agent control entity, delete the tunnel for forwarding the data packets towards the mobile node at the care of address.

In a further aspect of the present invention, a method of providing a tunnel for forwarding data packets towards a mobile node roaming in a foreign packet-switched data network in a system comprising a packet-switched network comprising a plurality of mobile agent traffic bearer entities and a mobile agent control entity is provided. Of the traffic bearer entities and the control entity, only the traffic bearer entities are configured to perform tunneling of data packets to the mobile node roaming in the foreign network. The control entity is configured to control tunneling management of the plurality of traffic bearer entities. The data packets are addressed to a home address of the mobile node. The mobile node is provided with a care of address for use in the foreign network.

The method includes the mobile agent control entity receiving a message indicating a binding between the home address and the care of address of the mobile node. The method includes the mobile agent control entity selecting a mobile agent traffic bearer entity from the plurality of mobile agent traffic bearer entities. The method also includes, in response to the binding message, the mobile agent control entity sending a tunnel creation control message to control the operation of the selected mobile agent traffic bearer entity. The method further includes the selected mobile agent traffic bearer entity receiving the tunnel creation control message from the mobile agent control entity. The method additionally includes in response to the tunnel creation control message, the selected mobile agent traffic bearer entity providing a tunnel for forwarding the data packets towards the mobile node at the care of address. The method also includes the mobile agent control entity sending a tunnel deletion control message to the selected mobile agent traffic bearer entity. The method further includes, in response to the tunnel deletion control message, the selected mobile agent traffic bearer entity deleting the tunnel for forwarding the data packets towards the mobile node at the care of address.

The selecting of the mobile agent traffic bearer entity is based on one or more parameters such as the geographical and/or topological proximity of the mobile node to the plurality of mobile agent traffic bearer entities, the quality of service capable of being provided by the plurality of mobile agent traffic bearer entities, and the security functions capable of being provided by the plurality of mobile agent traffic bearer entities.

In a further aspect, a computer-readable storage medium comprising instructions, that when executed perform the method for providing a tunnel described above is also provided.

According to an aspect of the present invention, there is provided a system for forwarding data packets towards a mobile node roaming in a foreign packet-switched data network, the data packets having been addressed to a home address of the mobile node, the mobile node being provided with a care of address for use in the foreign network, the system comprising:

a mobile agent control entity arranged to receive a message indicating a binding between the home address and the care of address of the mobile node, and, in response to the message, to send a control message to control the operation of a mobile agent traffic bearer entity; and a mobile agent traffic bearer entity arranged to receive the control message from the mobile agent control entity and, in response, to provide a resource for forwarding the data packets towards the mobile node at the care of address.

By providing a system comprising both a mobile agent control entity and a mobile agent traffic bearer entity, separation of functionality is achieved between control plane and user plane functions of conventional mobile agents. Thus resources (including both processor and processing capability) may be provided by network operators which are appropriate to the demands of each separate function. This results in improved efficiency, reliability and scalability in the network.

In one embodiment, the mobile agent control entity is a home agent control entity and the mobile agent traffic bearer entity is a home agent traffic bearer entity and the resource provided by the home agent traffic bearer entity is a tunnel from the home agent traffic bearer entity to the care of address of the mobile node.

In another embodiment, the mobile agent control entity is a foreign agent control entity and the mobile agent traffic bearer entity is a foreign agent traffic bearer entity and resource provided by the foreign agent traffic bearer entity is a tunnel from the foreign agent traffic bearer entity to a home agent of the mobile node.

In further embodiments, separation of function is implemented in both the home agent and foreign agent functions.

In preferred embodiments, the mobile agent control entity selects the mobile agent traffic bearer entity from a plurality of mobile agent traffic bearer entities which it is capable of controlling. Thus, efficiency, reliability and scalability are further improved because of the redundancy in mobile agent traffic bearer entities.

Preferably, the mobile agent control entity makes the selection in dependence on one or more of the following parameters:

a) the loading of the plurality of mobile agent traffic bearer entities;

b) the geographical and/or topological proximity of the mobile node to the plurality of mobile agent traffic bearer entities;

c) the quality of service capable of being provided by the plurality of mobile agent traffic bearer entities; and d) the security functions capable of being provided by the plurality of mobile agent traffic bearer entities.

Thus, a) load balancing between mobile agent traffic bearer entities is achieved; b) routing efficiency is improved—in particular, triangular routing is avoided where the mobile agent control entity is not on an optimal path between the mobile node and its correspondent node or nodes; c) quality of service is improved; and d) security procedures are used as appropriate.

According to another aspect of the present invention, there is provided a mobile agent control entity arranged to control the forwarding data packets towards a mobile node roaming in a foreign packet-switched data network, the data packets having been addressed to a home address of the mobile node, the mobile node being provided with a care of address for use in the foreign network, the mobile agent control entity being arranged to receive a message indicating a binding between the home address and the care of address of the mobile node, and, in response to the message, to control the operation of a mobile agent traffic bearer entity to provide a resource for forwarding the data packets towards the mobile node at the care of address.

According to a further aspect of the present invention, there is provided a mobile agent traffic bearer entity for forwarding data packets towards a mobile node roaming in a foreign packet-switched data network, the data packets having been addressed to a home address of the mobile node, the mobile node being provided with a care of address for use in the foreign network, the mobile agent traffic bearer entity being arranged to be controllable by a mobile agent control entity to provide a resource for forwarding the data packets towards the mobile node at the care of address, the mobile agent control entity controlling the mobile agent traffic bearer entity in response to receiving a message indicating a binding between the home address and the care of address of the mobile node.

According to a further aspect of the present invention, there is provided a method of providing a resource for forwarding data packets towards a mobile node roaming in a foreign packet-switched data network, the data packets having been addressed to a home address of the mobile node, the mobile node being provided with a care of address for use in the foreign network, the method comprising the following steps:

a) a mobile agent control entity receiving a message indicating a binding between the home address and the care of address of the mobile node, b) in response to the binding message, the mobile agent control entity sending a control message to control the operation of a mobile agent traffic bearer entity;

c) the mobile agent traffic bearer entity receiving the control message from the mobile agent control entity and, d) in response to the control message, the mobile agent traffic bearer entity providing a resource for forwarding the data packets towards the mobile node at the care of address.

There now follows, by way of example only, a detailed description of preferred embodiments of the present invention in which:

DETAILED DESCRIPTION OF THE PREFERRED EMBODIMENT

According to the present invention, the various functions conventionally performed by MAs (i.e., FAs and HAs) in MLPv4 and MIPv6 are divided into control plane functions and user plane functions. By user plane functions we mean a) the tunnelling of user data packets, addressed to an MN at its HAddr and intercepted by the MN's HA, to the MN's FA (MIPv4 FA-CoA mode) or to the MN directly (MIPv4 CoCoA mode and MIPv6) and b) the reverse tunnelling of user data packets from the MN (MIPv4 CoCoA mode and MIPv6) or FA (MIPv4 FA-CoA mode) to the MN's HA. By control plane functions we mean all other MA functions described in either MIPv4 or MIPv6 including MA advertisement, IP address allocation and management (FA in MIPv4 FA CoCoA mode), binding update management; MIP tunnelling management (i.e., managing the creation, maintenance and deletion of MIP tunnels as opposed to performing the tunnelling itself); Quality of Service (QoS) management, security and accounting, and policy control.

Figure 3:
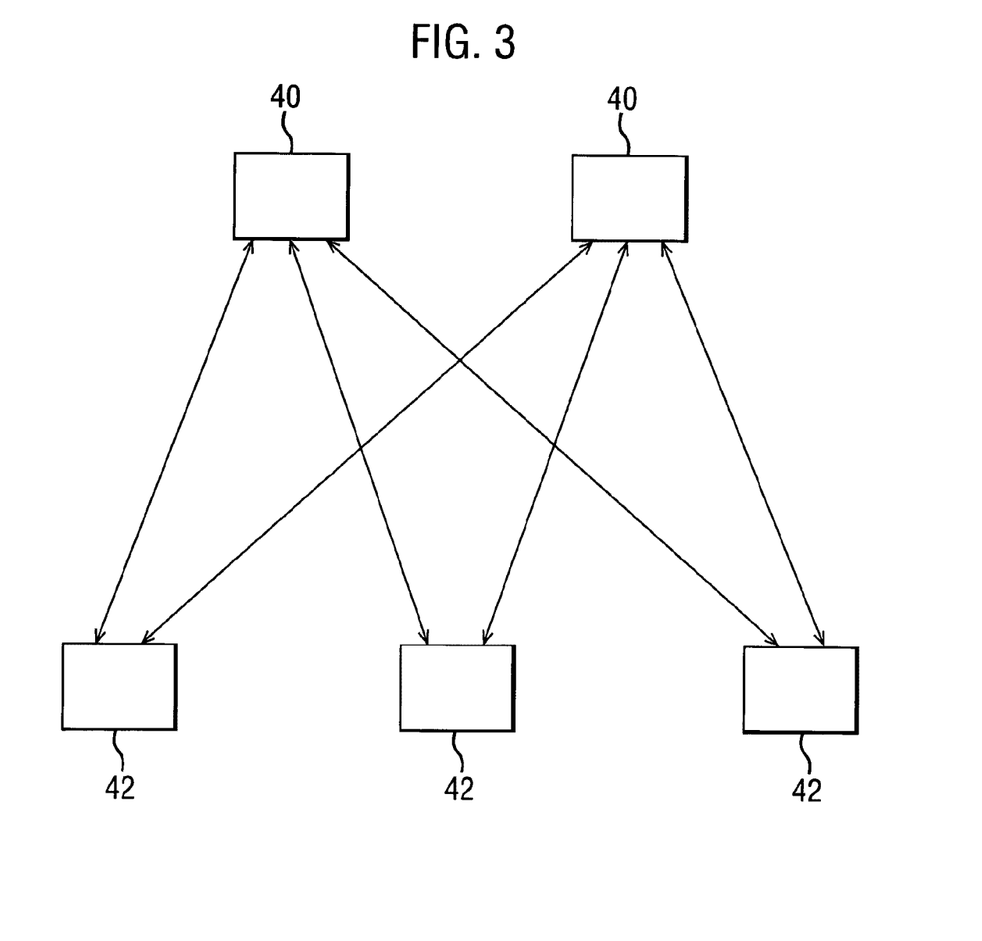
FIG. 3 is a block diagram showing a typical arrangement of mobile agent control entities and mobile agent traffic bearer entities according to the present invention.

According to the present invention, the control plane and user plane functions of MAs are handled by separate logical processes, and possibly separate physical processors. Let us call these separate processes or processors MA Control Entities (MA-CEs) and MA Traffic Bearer Entities (MA-TBEs). In any network or subnetwork, more than one MA-CE and more than one MA-TBE may be provided. In addition to performing the control plane and user plane functions described above, MA-CEs and MA-TBEs perform interfacing functions with each other with the MA-CE acting as master and the MA-TBE as slave. A MA-CE may control one or more MA-TBEs to create, refresh, maintain and delete tunnels. A MA-TBE may be controlled by one or more MA-CEs. Thus, in a general scenario as shown in FIG. 3, a many-to-many interface relationship exists between a plurality of MA-CEs 40 (here 2 are shown) and a plurality of MA-TBEs 42 (here 3 are shown). It is important to note that any of the MA-CEs and MA-TBEs deployed in a network or subnetwork may be physically located in the same processor. Thus, a processor may host two or more MA-CEs, two or more MA-TBEs or a combination of one or more MA-CEs and one or more MA-TBEs. However, preferably, at least some of the MA-CEs and MA-TBEs deployed in a network or subnetwork are located in separate physical processors which may be topologically and geographically distant. Furthermore, physically separate MA-CEs and MA-TBEs may be located in different subnetworks within a single administrative domain.

Having many-to-many relationships between MA-CEs and MA-TBEs, as shown in FIG. 3, allows for improved load balancing and resilience, but it will be appreciated that one-to-one, one-to-many, and many-to-one interface relationships may exist between MA-CEs and MA-TBEs. Note that where one-to-many or many-to-many interface relationships exist between MA-CEs and MA-TBEs, a MA-CE selects one of the MA-TBEs when creating a tunnel for a particular MN. The MA-TBE is preferably selected according to predetermined policy. Various predetermined policies and combinations of predetermined policies may be used. Accordingly, a MA-CE may select one of the MA-TBEs according any one, or according to any combination of two or more, of the following:

1) to balance the load between various MA-TBEs;
2) to minimize the routing overhead for packets tunnelled to or from the MN by selecting a MA-TBE which is geographically or topologically proximate to the MN's current point of attachment to the network in which it is roaming—note this MA-TBE may or may not be in the network in which the MN is roaming;
3) according to the security requirements of the data traffic—i.e., a MA-TBE with security gateway functions will be selected to serve incoming/outgoing traffic across a boundary between an Intranet and the Internet, while MA-TBE without security functions may be selected to serve traffic flowing within a Intranet; and
4) according to the QoS requirements of the data traffic—i.e., traffic with stringent QoS requirements such as VoIP or other real-time media traffic may be passed to a MA-TBE which guarantees low delay, low packet loss and low jitter while traffic without stringent QoS requirements such as HTTP/FTP etc may be passed to those MA-TBE that do not provide QoS differentiations.

Figure 4:
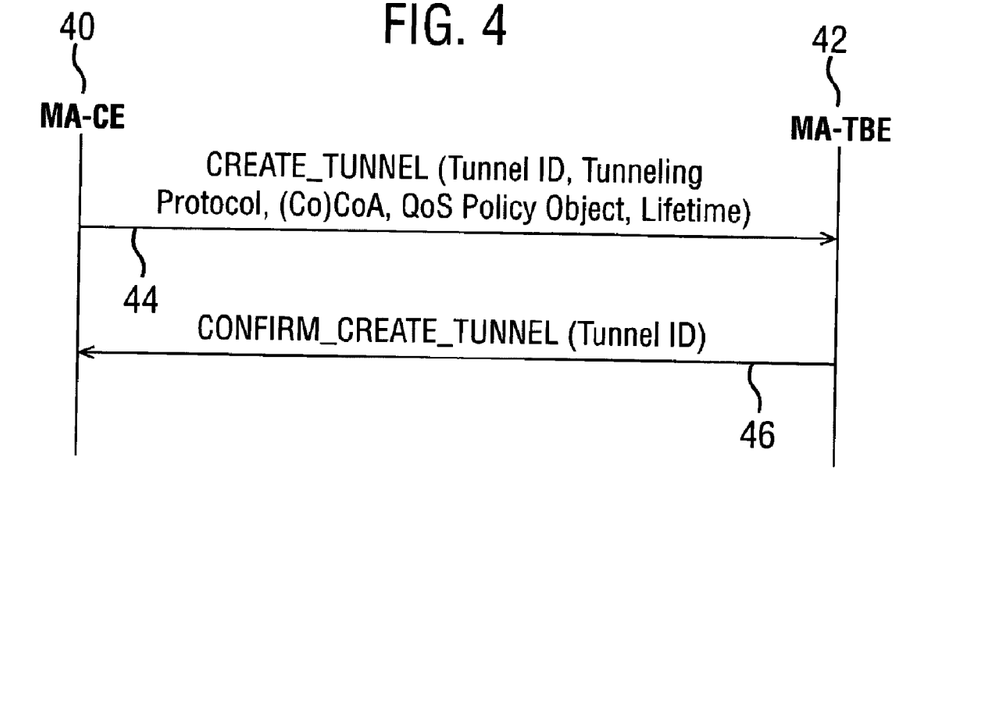
FIGS. 4 to 7 are message flow diagrams showing how a mobile agent control entity may instruct the creation, maintenance and deletion of tunnels by a mobile agent traffic bearer entity according to the present invention.

FIGS. 4 to 7 are message flow diagrams showing how a MA-CE may instruct the creation, maintenance and deletion of tunnels by a MA-TBE. FIG. 4 shows how MA-CE 40 controls MA-TBE 42 to create a tunnel for a given MN by sending, at step 44, a CREATE_TUNNEL request message with the following parameters: a tunnel ID identifying the tunnel to be created uniquely within the network or subnetwork, the tunneling protocol to be used (such as IP in IP encapsulation according to RFC 2003, Generic Routing Encapsulation according to RFC 2784, Minimum Encapsulation RFC 2004), the (Co)CoA and HAddr for the MN, a QoS policy object (for example, defining minima and/or maxima bandwidth, delay etc or specifying a DiffServ Code Point (DSCP)), and a lifetime for the tunnel. MA-TBE 42 checks the validity of the message and, if valid, creates a tunnel in respect of the MN—i.e., creates a tunnel database entry so that received packets addressed to the HAddr of the MN are routed to the (Co)CoA of the MN using the selected tunneling protocol. At step 46, MA-TBE 42 confirms the creation of the tunnel by sending to MA-CE 40 a CONFIRM_CREATE_TUNNEL response message specifying the tunnel ID. In one embodiment, where MA-CE and MA-TBE are within the same network or subnetwork, on receipt of the CONFIRM_CREATE_TUNNEL response message, MA-CE 40 advertises the IP address of MA-TBE 42 within the IP internal routing mechanisms used in the network or subnetwork so that data packets addressed to the MN at its HAddr are routed to MA-TBE 42. In another embodiment, MA-TBE 40 itself advertises its IP address within the IP internal routing mechanisms used in the network or subnetwork so that data packets addressed to the MN at its HAddr are routed to it. This embodiment is necessary where MA-CE 40 and MA-TBE 42 are in different subnetworks.

Figure 5:
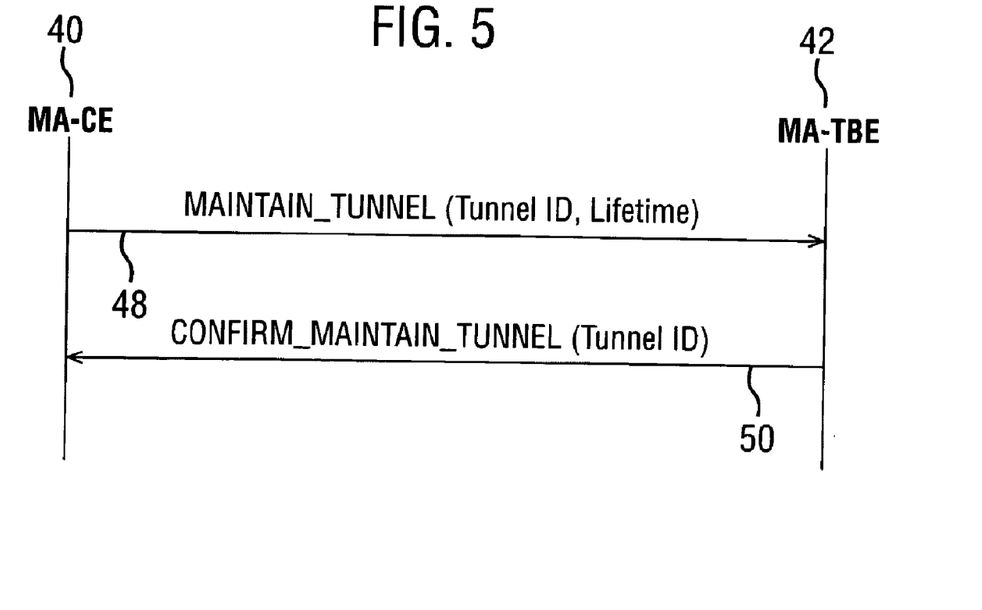

Tunnels created by MA-TBEs have a specified lifetime. After expiry of the lifetime, the tunnel is deleted—i.e., the entry in the tunnel data base entry is deleted. A data packet addressed to the MN at its HAddr arriving at a MA-TBE where no tunnel exists will be discarded. To keep a tunnel alive, the lifetime of the tunnel must be extended. FIG. 5 shows how MA-CE 40 may extend the lifetime of a tunnel by sending, at step 48, a MAINTAIN_TUNNEL request message to MA-TBE 42 with the tunnel ID and a new lifetime. To indicate success, MA-TBE 42 responds by sending MA-CE 40 a CONFIRM_MAINTAIN_TUNNEL response message at step 50.

Figure 6:
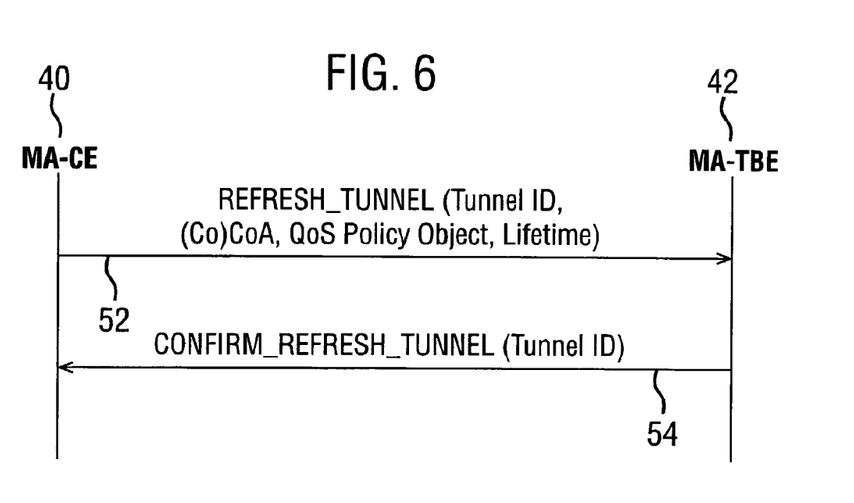

FIG. 6 shows how MA-CE 40 may change other parameters of a tunnel, such as the QoS or (Co)CoA. At step 52, MA-CE 40 sends a REFRESH_TUNNEL request message to MA-TBE 42 with the tunnel ID, new (Co)CoA, new QoS Policy Object and a new lifetime. To indicate successful changing of tunnel parameters, MA-TBE 42 responds by sending MA-CE 40 a CONFIRM_REFRESH_TUNNEL response message at step 54.

Figure 7:
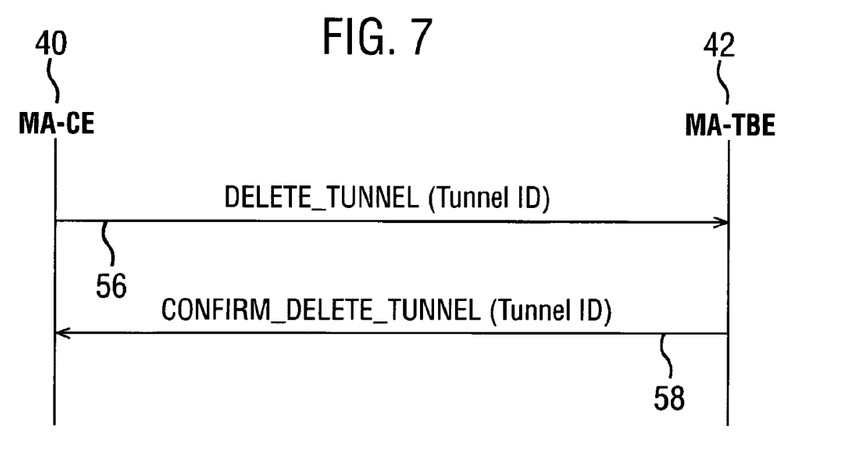

FIG. 7 shows how MA-CE 40 may delete a tunnel before its lifetime expires. At step 56, MA-CE 40 send, a DELETE_TUNNEL request message to MA-TBE 42 specifying the tunnel ID. To indicate successful deletion of a tunnel, MA-TBE 42 responds by sending MA-CE 40 a CONFIRM_DELETE_TUNNEL response message at step 58.

In one embodiment, the interface between MA-CEs and MA-TBEs is provided using the Simple Network Management Protocol (SNMP) with suitably defined extensions for the request-response messages described above.

Although a plurality of MA-CEs and MA-TBEs may be deployed in networks or subnetworks implementing MIPv6 or MIPv4 CoCoA mode, at any one time a single MN roaming away from home will only be served by one MA-CE and one MA-TBE—i.e., by one Home Agent Control Entity (HA-CE) and one Home Agent Traffic Bearer Entity (HA-TBE). Similarly, in networks or subnetworks implementing MIPv4 FA-CoA mode, at any one time a single MN roaming away from home will only be served by one or possibly two MA-CEs and one or possibly two MA-TBEs depending on whether separate MA-CEs and MA-TBEs are deployed for both HAs and FAs, HAs only, or FAs only. Thus, in networks or subnetworks implementing MIPv4 FA-CoA mode, at any one time a single MN roaming away from home will only be served by either: a) one HA-CE, one HA-TBE, and a conventional FA; b) one Foreign Agent Control Entity (FA-CE), one Foreign Agent Traffic Bearer Entity (FA-TBE) and a conventional HA, or c) one HA-CE, one HC-TBE, one FA-CE and one FA-TBE. In all the four cases identified above (1 MIPv6 or MIPv4 CoCoA mode case and 3 MIPv4 FA-CoA mode cases), the MN roaming away from home will identify its serving HA-CE and FA-CE (MIPv4 FA-CoA mode) through conventional HA and FA discovery mechanisms as described in the MIPv4 and M.Pv6 specifications.

For "forward" tunnelling of user data packets towards the MN, the MN need not know the identity of its serving HA-TBE or FA-TBE (MIPv4 FA-CoA mode) although user data packets will be tunnelled from the HA-TBE and possibly forwarded on from the FA-TBE (MIPv4 FA-CoA mode). Similarly, for all conventional control plane interactions between MN and HA/FA, the MN need not know the identity of its serving HA-TBE or FA-TBE (MIPv4 FA-CoA mode) since, according to the present invention, it will perform such interactions with the HA-CE or FA-CE (MIPv4 FA-CoA mode) only. However, for reverse tunnelling, the MN will additionally need to know the identity of its serving HA-TBE and FA-TBE (MIPv4 FA-CoA mode). According to the present invention, a mechanism for informing the MN of its serving HA-TBE and FA-TBE (MIPv4 FA-CoA mode) is provided. For MIPv4 FA-CoA mode, the MN knows the address of the FA-TBE from the FA-CE because the FA-COA is the address of the FA-TBE as the exit of the tunnel and it is assigned by the FA-TBE. For MIPv4 CoCoA mode and MIPv6, the address the HA-TBE is provided to the MN after a successful binding update (or registration) with the HA-CE which returns the address of the HA-TBE to the MN.

Figure 8:
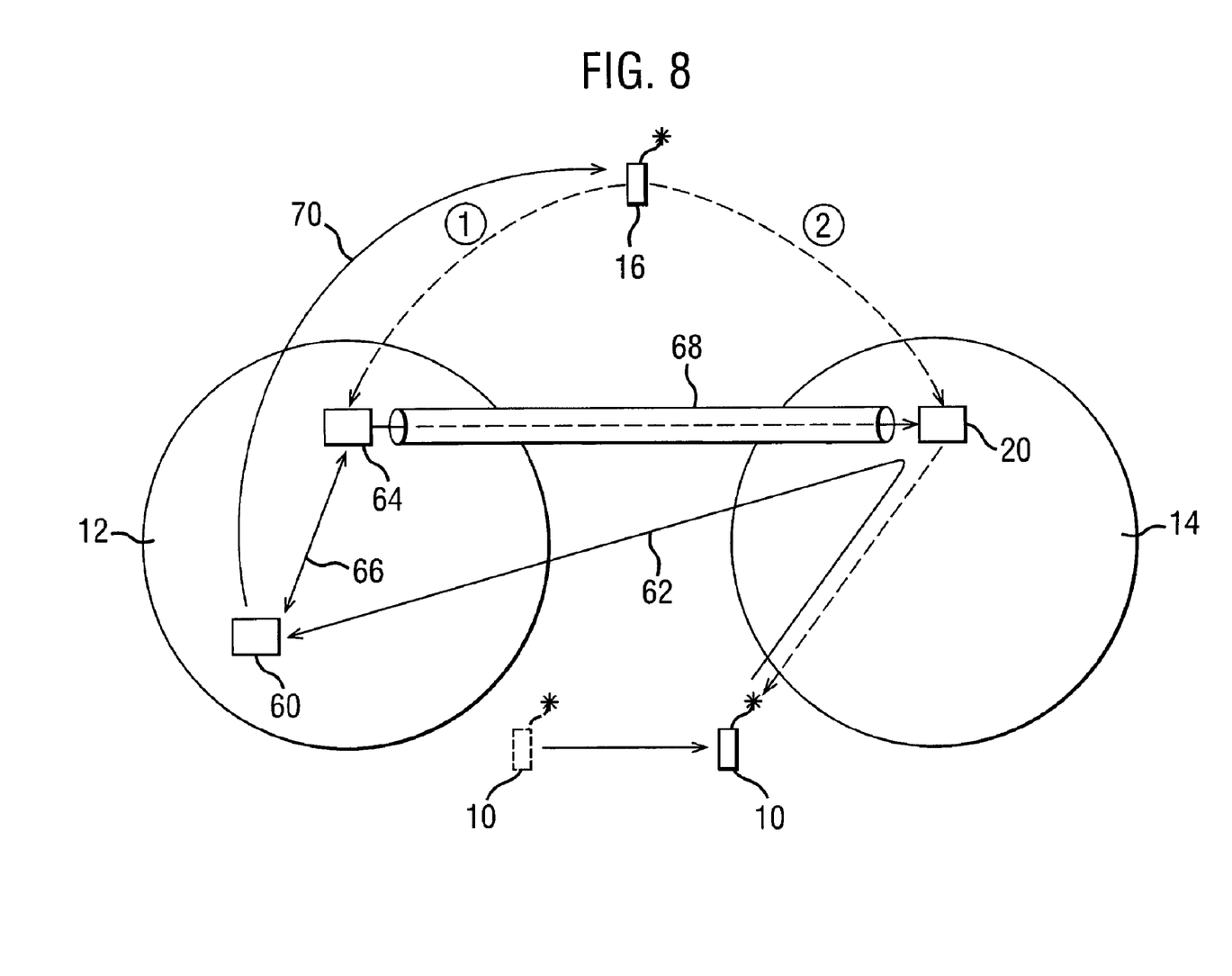
FIGS. 8 to 10 show MIPv4 FA-CoA mode mobility management with separation of MA functionality according to the present invention.

MIPv4 and MIPv6 mobility management with separation of control plane signaling and user plane data traffic between MA-CE and MA-TBE, according to various embodiments of the present invention, will now be described with reference to FIGS. 8 to 11. FIG. 8 shows MIPv4 FA-CoA mode mobility management with separation of HA functionality implemented in HN 12, but no separation of FA functionality implemented in FN 14. MN 10 is allocated a HAddr in HN 12. When the MN roams to FN 14, it is allocated a CoA by a conventional FA 20 in the FN. After allocation of the CoA, MN 10 identifies the router 60 in HN 12 acting as its HA-CE through conventional HA discovery mechanisms and sends a binding update message 62 to it via the FA to register the CoA. HA-CE 60 selects HA-TBE 64 to serve MN 10 and instructs it, with a CREATE_TUNNEL request message 66, to create MIP tunnel 68. Thereafter, when CN 16 sends a packet to the HAddr of the MN in its HN (case 1), the packet is intercepted by the HA-TBE and tunnelled to the FA in the FN via tunnel 68 on the basis of the CoA. Optionally, HA-CE 60 may send a binding update message 70 to the CN to register the CoA of the MN. Thereafter, the CN may address packets directly to the MN at its current CoA, rather than indirectly via its HAddr (case 2), and these packets are received by the FA in the FN and routed to the MN using routing procedures in the FN.

Figure 9:
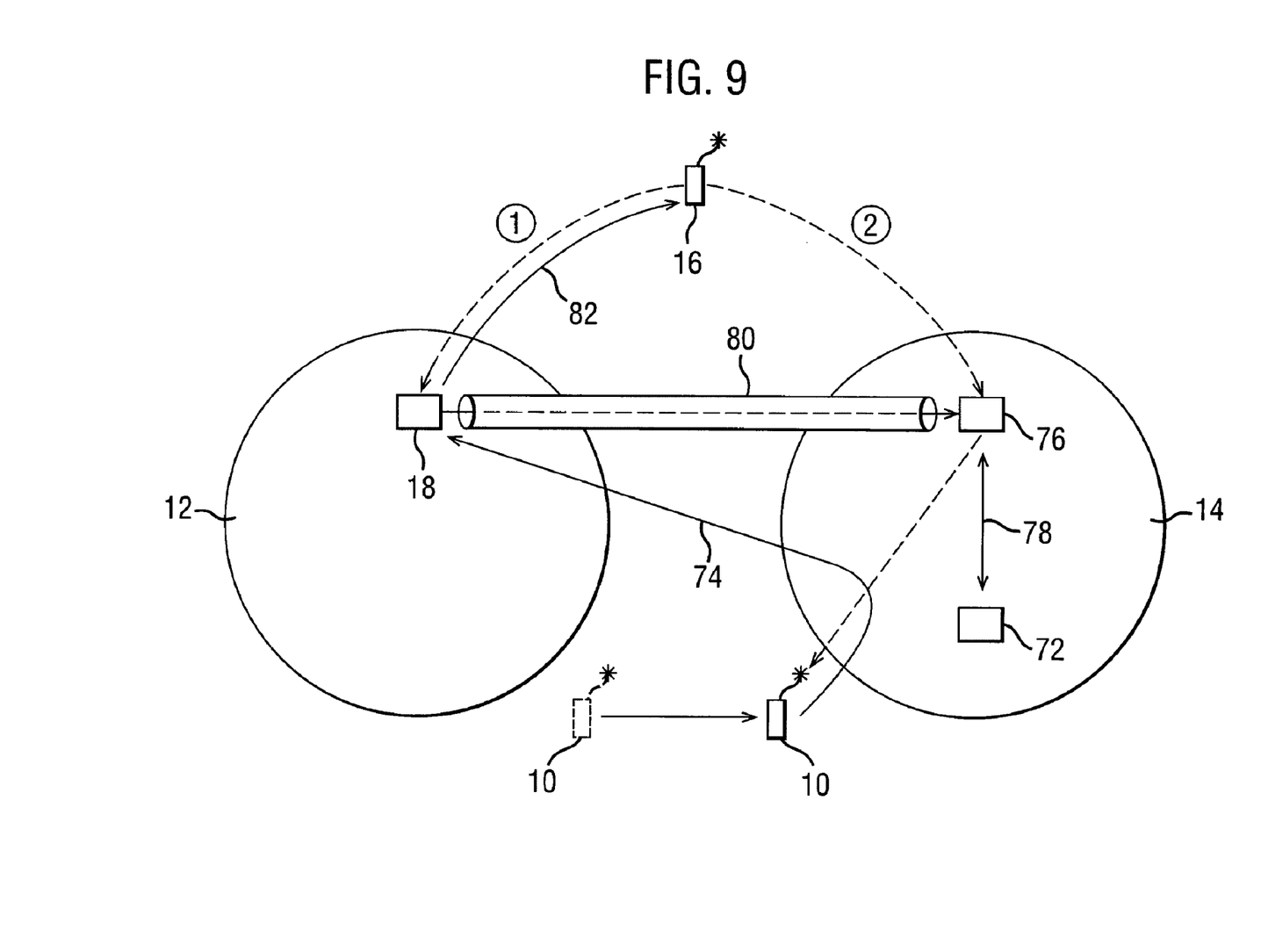

FIG. 9 shows MIPv4 FA-CoA mode mobility management with separation of FA functionality implemented in FN 14, but no separation of HA functionality implemented in HN 12. MN 10 is allocated a HAddr in HN 12. When the MN roams to FN 14, it is allocated a CoA by a FA-CE 72 in the FN. To achieve this, FA-CE 72 selects FA-TBE 76 to serve MN 10 and sends a request message 78 to FA-TBE 76 requesting FA-TBE 76 to provide a CoA for MN 10. Alternatively, FA-CE 72 may be statically or dynamically configured with a pool of one or more CoAs corresponding to one or more FA-TBEs and may select FA-TBE 76 and allocate a corresponding CoA without sending request message 78. After allocation of the CoA, MN 10 identifies the router 18 in HN 12 acting as its HA through conventional HA discovery mechanisms and sends a binding update message 74 to it via the FA-CE to register the CoA. HA 18 creates MIP tunnel 80 to FA-TBE 76 on the basis of the CoA. Thereafter, when a CN 16 sends a packet to the HAddr of the MN in its HN (case 1), the packet is intercepted by the HA and tunnelled to the FA-TBE in the FN via tunnel 80 on the basis of the CoA. Optionally, HA 18 may send a binding update message 82 to the CN to register the CoA of the MN. Thereafter, the CN may address packets directly to the MN at its current CoA, rather than indirectly via its HAddr (case 2), and these packets are received by the FA-TBE in the FN and routed to the MN using routing procedures in the FN.

Figure 10:
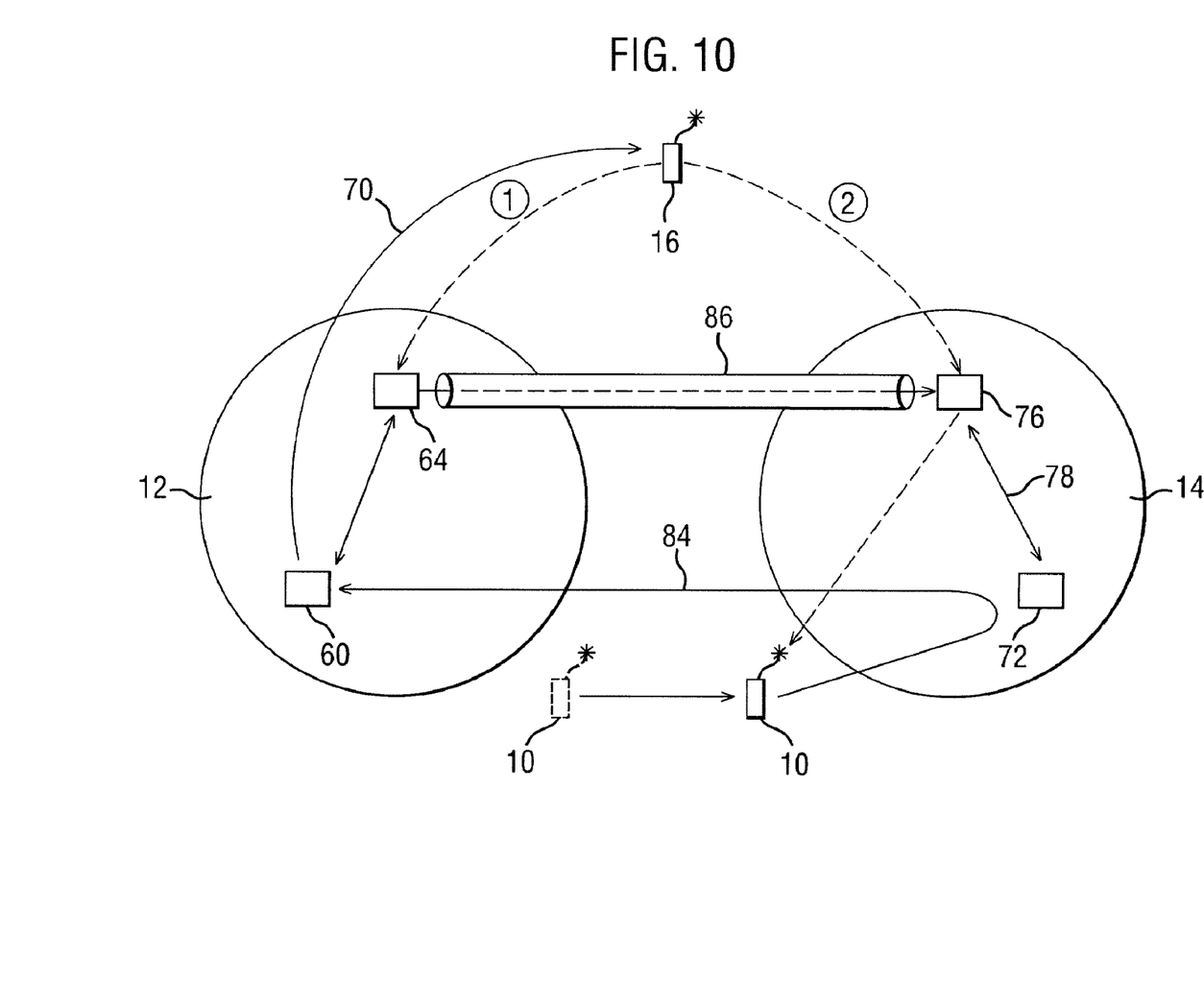

FIG. 10 shows MIPv4 FA-CoA mode mobility management with separation of HA functionality implemented in HN 12, and separation of FA functionality implemented in FN 14. MN 10 is allocated a HAddr in HN 12. When the MN roams to FN 14, it is allocated a CoA by a FA-CE 72 in the FN. To achieve this, FA-CE 72 selects FA-TBE 76 to serve MN 10 and sends a request message 78 to FA-TBE 76 requesting FA-TBE 76 to provide a CoA for MN 10. Alternatively, FA-CE 72 may be statically or dynamically configured with a pool of one or more CoAs corresponding to one or more FA-TBEs and may select FA-TBE 76 and allocate a corresponding CoA without sending request message 78. After allocation of the CoA, MN 10 identifies the router 60 in HN 12 acting as its HA-CE through conventional HA discovery mechanisms and sends a binding update message 84 to it via the FA-CE to register the CoA. HA-CE 60 selects HA-TBE 64 to serve MN 10 and instructs it, with a CREATE_TUNNEL request message 66, to create MIP tunnel 86. Thereafter, when CN 16 sends a packet to the HAddr of the MN in its HN (case 1), the packet is intercepted by the HA-TBE and tunnelled to the FA-TBE in the FN via tunnel 86 on the basis of the CoA. Optionally, HA-CE 60 may send a binding update message 70 to the CN to register the CoA of the MN. Thereafter, the CN may address packets directly to the MN at its current CoA, rather than indirectly via its HAddr (case 2), and these packets are received by the FA-TBE in the FN and routed to the MN using routing procedures in the FN.

Figure 11:
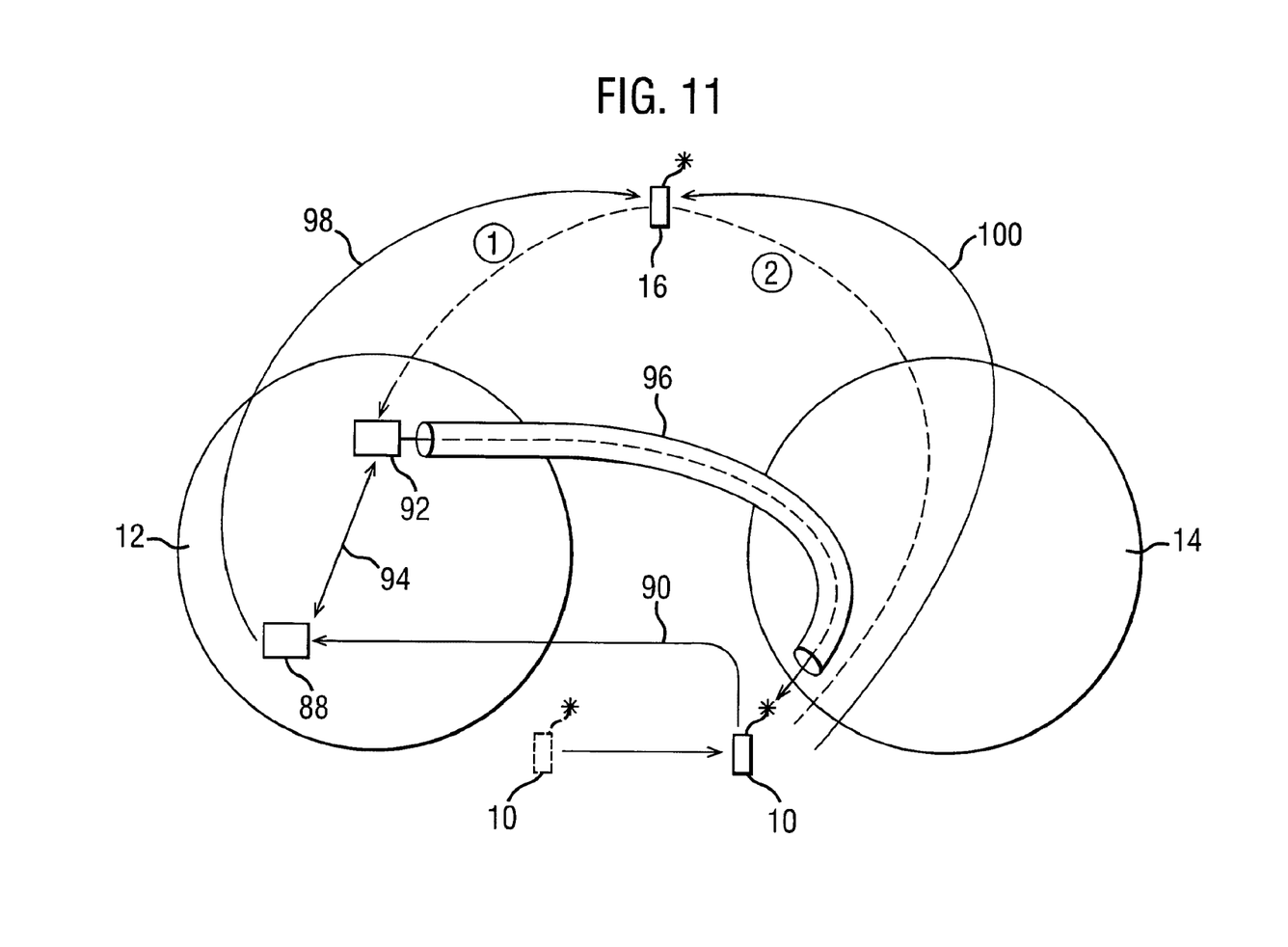
FIGS. 11 shows MIPv6 and MIPv4 CoCoA mode mobility management with separation of MA functionality according to the present invention.

FIG. 11 shows MIPv4 CoCoA mode and MIPv6 mobility management with separation of HA functionality implemented in HN 12. MN 10 is allocated a HAddr in HN 12. When the MN roams to FN 14, it is allocated a (Co)CoA by an address allocation mechanism of FN 14. After allocation of the (Co)CoA, MN 10 identifies the router 88 in HN 12 acting as its HA-CE through conventional HA discovery mechanisms and sends a binding update message 90 to it to register the (Co)CoA. HA-CE 88 selects HA-TBE 92 to serve MN 10 and instructs it, with a CREATE_TUNNEL request message 94, to create MIP tunnel 96. Thereafter, when CN 16 sends a packet to the HAddr of the MN in its HN (case 1), the packet is intercepted by the HA-TBE and tunnelled to the FA in the FN via tunnel 96 on the basis of the (Co)CoA. With MIPv4 CoCoA mode, HA-CE 88 may optionally send a binding update message 98 to the CN to register its CoCoA. With MIPv6, MN 10 should send a binding update message 100 to the CN to register its CoA. In either case, thereafter the CN may address packets directly to the MN at its current (Co)CoA, rather than indirectly via its HAddr (case 2).

Although FIGS. 8 to 11 show MIP mobility management where a MA-CE controls a MA-TBE which is in the same network or subnetwork, it will be appreciated that the present invention also applies where a MA-CE, in one subnetwork of an administrative domain controls a MA-TBE in a different subnetwork of the same administrative domain, as previously mentioned. Thus, a HA-CE in one subnetwork may control a HA-TBE in a different subnetwork of the same administrative domain. Similarly, a FA-CE in one subnetwork may control a FA-TBE in a different subnetwork of the same administrative domain.

MA-TBEs may also perform packet filtering functions and/or tunnel switching functions such as switching between MIP tunnels, G-GPRS Tunnelling Protocol (GTP) tunnels of GPRS networks and Virtual Private Network (VPN) tunnels.

It will also be appreciated that the present invention has application to mobility management in any type of packet-switched data network and where a mobile node roams between packet-switched data networks or subnetworks of the same or different type.

Furthermore, it will be appreciated that the present invention applies to mobility management in packet-switched data networks for any type of packet data protocol, whether IP or not, and to mobility management using protocols other than MIPv4 or MIPv6.

What is claimed is:

1. A system for forwarding data packets towards a mobile node roaming in a foreign packet-switched data network, the data packets having been addressed to a home address of the mobile node, the mobile node being provided with a care of address for use in the foreign network, the system comprising:
   a packet-switched network comprising a plurality of mobile agent traffic bearer entities and a mobile agent control entity, wherein of the traffic bearer entities and the control entity, only the traffic bearer entities are configured to perform tunneling of data packets to the mobile node roaming in the foreign network, and the control entity is configured to control tunneling management of the plurality of traffic bearer entities,
   wherein the control entity is further configured to:
      receive a plurality of binding messages, each binding message indicating a binding between the home address and the care of address of the mobile node;
      select one or more traffic bearer entities from the plurality of traffic bearer entities; and
      in response to the received binding message, send a first control message to control the operation of at least one of the one or more selected mobile agent traffic bearer entities,
   wherein the at least one selected mobile agent traffic bearer entity is further configured to:
      receive the first control message from the mobile agent control entity; and
      in response to the first control message, provide a resource for forwarding the data packets towards the mobile node at the care of address,
   wherein all resources in the system for forwarding the data packets towards the mobile node at the care of address are provided by the mobile agent traffic bearer entities,
   wherein the mobile agent control entity is configured to select the mobile agent traffic bearer entity based on one or more of the following parameters:
      the geographical and/or topological proximity of the mobile node to the plurality of mobile agent traffic bearer entities;
      the quality of service capable of being provided by the plurality of mobile agent traffic bearer entities; and
      the security functions capable of being provided by the plurality of mobile agent traffic bearer entities,
   wherein the mobile agent control entity is further configured to send a second control message to the at least one of the one or more selected mobile agent traffic bearer entities, and
   wherein the at least one selected mobile agent traffic bearer entity is further configured to, in response to the second control message, release the resource for forwarding the data packets towards the mobile node at the care of address.

2. The system according to claim 1, wherein the mobile agent control entity is a home agent control entity and the mobile agent traffic bearer entity is a home agent traffic bearer entity.

3. The system according to claim 2, wherein the tunnel provided by the home agent traffic bearer entity is from the home agent traffic bearer entity to the care of address of the mobile node.

4. The system according to claim 1, wherein the mobile agent control entity is a foreign agent control entity and the mobile agent traffic bearer entity is a foreign agent traffic bearer entity.

5. The system according to claim 4, wherein the tunnel provided by the foreign agent traffic bearer entity is from the foreign agent traffic bearer entity to a home agent of the mobile node.

6. A mobile agent control entity in a packet-switched network comprising a plurality of mobile agent traffic bearer entities and a mobile agent control entity, wherein of the traffic bearer entities and the control entity, only the traffic bearer entities are configured to perform tunneling of data packets to a mobile node roaming in a foreign network, and the control entity is configured to control tunneling management of the plurality of traffic bearer entities and to control the forwarding data packets towards a mobile node roaming in a foreign packet-switched data network, the data packets having been addressed to a home address of the mobile node, the mobile node being provided with a care of address for use in the foreign network,
   wherein the mobile agent control entity is further configured to receive a message indicating a binding between the home address and the care of address of the mobile node, to select the mobile agent traffic bearer entity from the plurality of traffic bearer entities, and, in response to the binding message, to control the operation of the selected mobile agent traffic bearer entity to provide a tunnel for forwarding the data packets towards the mobile node at the care of address, wherein the mobile agent control entity is configured to select the mobile agent traffic bearer entity based on one or more of the following parameters:
      the geographical and/or topological proximity of the mobile node to the plurality of mobile agent traffic bearer entities;
      the quality of service capable of being provided by the plurality of mobile agent traffic bearer entities; and
      the security functions capable of being provided by the plurality of mobile agent traffic bearer entities, and
   wherein the mobile agent control entity is further configured to instruct the selected mobile agent traffic bearer entity to delete the tunnel for forwarding the data packets towards the mobile node at the care of address.

7. A mobile agent traffic bearer entity in a packet-switched network comprising a plurality of mobile agent traffic bearer entities and a mobile agent control entity, wherein the control entity is configured to control tunneling management of the plurality of traffic bearer entities, and of the traffic bearer entities and the control entity, only the traffic bearer entities are configured to perform tunneling of data packets to a mobile node roaming in a foreign network, and wherein the traffic bearer entity is configured to forward data packets towards a mobile node roaming in a foreign packet-switched data network, the data packets having been addressed to a home address of the mobile node, the mobile node being provided with a care of address for use in the foreign network, the mobile agent traffic bearer entity being further configured to be controllable by the mobile agent control entity to provide a tunnel for forwarding the data packets towards the mobile node at the care of address, wherein the mobile agent control entity is configured to control the mobile agent traffic bearer entity in response to receiving a message indicating a binding between the home address and the care of address of the mobile node, wherein the mobile agent control entity is configured to select the mobile agent traffic bearer entity from a plurality of mobile agent traffic bearer entities which the mobile agent control entity is configured to control, and wherein the mobile agent control entity is configured to select the mobile agent traffic bearer entity based on one or more of the following parameters:

the geographical and/or topological proximity of the mobile node to the plurality of mobile agent traffic bearer entities;

the quality of service capable of being provided by the plurality of mobile agent traffic bearer entities; and the security functions capable of being provided by the plurality of mobile agent traffic bearer entities, and wherein the mobile agent traffic bearer entity is further controllable by the mobile agent control entity to, in response to a tunnel deletion control message transmitted by the mobile agent control entity, delete the tunnel for forwarding the data packets towards the mobile node at the care of address.

8. A method of providing a tunnel for forwarding data packets towards a mobile node roaming in a foreign packet-switched data network in a system comprising a packet-switched network comprising a plurality of mobile agent traffic bearer entities and a mobile agent control entity, wherein of the traffic bearer entities and the control entity, only the traffic bearer entities are configured to perform tunneling of data packets to the mobile node roaming in the foreign network, and the control entity is configured to control tunneling management of the plurality of traffic bearer entities, the data packets having been addressed to a home address of the mobile node, the mobile node being provided with a care of address for use in the foreign network, the method comprising:

the mobile agent control entity receiving a message indicating a binding between the home address and the care of address of the mobile node;

the mobile agent control entity selecting a mobile agent traffic bearer entity from the plurality of mobile agent traffic bearer entities;

in response to the binding message, the mobile agent control entity sending a tunnel creation control message to control the operation of the selected mobile agent traffic bearer entity;

the selected mobile agent traffic bearer entity receiving the tunnel creation control message from the mobile agent control entity;

in response to the tunnel creation control message, the selected mobile agent traffic bearer entity providing a tunnel for forwarding the data packets towards the mobile node at the care of address, the mobile agent control entity sending a tunnel deletion control message to the selected mobile agent traffic bearer entity; and in response to the tunnel deletion control message, the selected mobile agent traffic bearer entity deleting the tunnel for forwarding the data packets towards the mobile node at the care of address, wherein selecting the mobile agent traffic bearer entity is based on one or more of the following parameters:

the geographical and/or topological proximity of the mobile node to the plurality of mobile agent traffic bearer entities;

the quality of service capable of being provided by the plurality of mobile agent traffic bearer entities; and the security functions capable of being provided by the plurality of mobile agent traffic bearer entities.

9. The method according to claim 8, wherein the mobile agent control entity is a home agent control entity and the mobile agent traffic bearer entity is a home agent traffic bearer entity.

10. The method according to claim 9, wherein the tunnel provided by the home agent traffic bearer entity is from the home agent traffic bearer entity to the care of address of the mobile node.

11. The method according to claim 8, wherein the mobile agent control entity is a foreign agent control entity and the mobile agent traffic bearer entity is a foreign agent traffic bearer entity.

12. The method according to claim 11, wherein the tunnel provided by the foreign agent traffic bearer entity is from the foreign agent traffic bearer entity to a home agent of the mobile node.

13. A non-transitory computer-readable storage medium comprising instructions, that when executed perform a method for providing a tunnel for forwarding data packets towards a mobile node roaming in a foreign packet-switched data network in a system comprising a packet-switched network comprising a plurality of mobile agent traffic bearer entities and a mobile agent control entity, wherein of the traffic bearer entities and the control entity, only the traffic bearer entities are configured to perform tunneling of data packets to the mobile node roaming in the foreign network, and the control entity is configured to control tunneling management of the plurality of traffic bearer entities, the data packets having been addressed to a home address of the mobile node, the mobile node being provided with a care of address for use in the foreign network comprising:

the mobile agent control entity receiving a message indicating a binding between the home address and the care of address of the mobile node;

the mobile agent control entity selecting a mobile agent traffic bearer entity from the plurality of mobile agent traffic bearer entities;

in response to the binding message, the mobile agent control entity sending a tunnel creation control message to control the operation of the selected mobile agent traffic bearer entity;

the selected mobile agent traffic bearer entity receiving the tunnel creation control message from the mobile agent control entity;

in response to the tunnel creation control message, the selected mobile agent traffic bearer entity providing a tunnel for forwarding the data packets towards the mobile node at the care of address, the mobile agent control entity sending a tunnel deletion control message to the selected mobile agent traffic bearer entity; and in response to the tunnel deletion control message, the selected mobile agent traffic bearer entity deleting the tunnel for forwarding the data packets towards the mobile node at the care of address, wherein selecting the mobile agent traffic bearer entity is based on one or more of the following parameters:

the geographical and/or topological proximity of the mobile node to the plurality of mobile agent traffic bearer entities;

the quality of service capable of being provided by the plurality of mobile agent traffic bearer entities; and the security functions capable of being provided by the plurality of mobile agent traffic bearer entities.

* * * * *